(12) United States Patent
Eidam et al.

(10) Patent No.: US 10,262,509 B1
(45) Date of Patent: *Apr. 16, 2019

(54) AUTOMATIC NOTIFICATION GENERATION

(71) Applicant: Wells Fargo Bank, N.A., San Francisco, CA (US)

(72) Inventors: Kourtney Eidam, Marietta, GA (US); Michael T. Duke, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/973,632

(22) Filed: May 8, 2018

Related U.S. Application Data

(63) Continuation of application No. 14/988,916, filed on Jan. 6, 2016, now Pat. No. 9,990,814.

(60) Provisional application No. 62/200,840, filed on Aug. 4, 2015.

(51) Int. Cl.
G08B 21/00 (2006.01)
G08B 5/36 (2006.01)
H04W 4/02 (2018.01)
H04N 5/76 (2006.01)

(52) U.S. Cl.
CPC ............... *G08B 5/36* (2013.01); *H04N 5/76* (2013.01); *H04W 4/02* (2013.01)

(58) Field of Classification Search
CPC ..... B60T 7/12; B60T 7/18; B62B 3/14; B62B 3/1404; B62B 5/00; B62B 5/0423; G01C 17/00; G01C 21/20; G01C 21/206; G01H 11/08; G01P 3/02; G01P 3/48; G01S 11/06; G01S 5/00; G01S 5/0268; G01S 5/14

USPC ... 340/540, 571, 691.6, 692, 3.1, 3.43, 7.51, 340/7.55, 825.24, 825.25, 825.49
See application file for complete search history.

(56) References Cited

U.S. PATENT DOCUMENTS

| 7,849,509 | B2 | 12/2010 | Venkatapathy et al. |
| 7,937,692 | B2 | 5/2011 | Drepper |
| 8,726,254 | B2 | 5/2014 | Rohde et al. |
| 8,844,043 | B2 | 9/2014 | Williams et al. |
| 9,081,799 | B2 | 7/2015 | King et al. |
| 9,990,814 | B1 * | 6/2018 | Eidam ...................... H04N 5/76 |
| 2007/0220370 | A1 | 9/2007 | Branda et al. |
| 2007/0249406 | A1 | 10/2007 | Andreasson |
| 2008/0176596 | A1 * | 7/2008 | Jung ................. H04W 36/0011 455/552.1 |

(Continued)

FOREIGN PATENT DOCUMENTS

EP 2 259 180 A1 8/2010

*Primary Examiner* — Daniel Previl
(74) *Attorney, Agent, or Firm* — Merchant & Gould P.C.

(57) ABSTRACT

An electronic computing device includes a processing unit and system memory. The system memory includes instructions which, when executed by the processing unit, cause the electronic computing device to monitor audio from a conversation. One or more keywords are identified from the audio. A context of the conversation is identified from the audio. One or more alerts are displayed on a display screen of the electronic computing device. Each of the one or more alerts corresponds to the context of the conversation. Each of the one or more alerts corresponds to a notification to be communicated to an individual. One of the notifications is obtained. The notification is displayed on the display screen of the electronic computing device.

20 Claims, 9 Drawing Sheets

(56) References Cited

U.S. PATENT DOCUMENTS

| | | |
|---|---|---|
| 2008/0228815 A1 | 9/2008 | Senn et al. |
| 2009/0248635 A1 | 10/2009 | Gross |
| 2009/0282474 A1 | 11/2009 | Chen et al. |
| 2013/0290786 A1 | 10/2013 | Artzi et al. |
| 2014/0356836 A1* | 12/2014 | Van Dalen ........... G09B 23/303 |
| | | 434/268 |
| 2014/0359776 A1 | 12/2014 | Liu |
| 2014/0372985 A1 | 12/2014 | Levin et al. |
| 2015/0356836 A1* | 12/2015 | Schlesinger ............. G08B 3/10 |
| | | 704/235 |
| 2015/0370531 A1 | 12/2015 | Faaborg |
| 2016/0191958 A1 | 6/2016 | Nauseef et al. |
| 2016/0301639 A1 | 10/2016 | Liu et al. |
| 2017/0188097 A1* | 6/2017 | Jones ................. H04N 21/4542 |

* cited by examiner

Example Checklist for Checking Account

☐ Minimum Balance

☐ Fees

☐ Surcharges

☐ Waivers

☐ Bonuses

Example Checklist for Payment Card

☐ Initial APR

☐ Changes to APR

☐ Fees

☐ Loss of Card

☐ Zero Liability Protection

Example Checklist for Mortgage

☐ Initial APR
☐ Changes to APR
☐ Application Costs
☐ Closing Costs
☐ Late Payments
☐ Private Mortgage Insurance
☐ Foreclosure Alert

AUTOMATIC NOTIFICATION GENERATION

BACKGROUND

When employees of certain types of businesses and organizations interact with customers, the employees are sometimes required to provide specific notices and disclaimers to the customers. For example, when a customer applies for a new payment card at a bank, an employee of the bank may be required to tell the customer what an annual percentage rate (APR) will be for the payment card. If the APR is an introductory rate, the employee may be required to tell the customer when the introductory rate expires and what a new APR will be after the introductory rate expires.

Some notices and disclaimers are communicated to customers in accordance with a company's business policy. Other notices and disclaimers may be required to be communicated to customers and other individuals by law. However, when the employee interacts with the customer, the employee may not realize that a specific disclaimer or notice is required to be communicated to the customer. At other times, the employee may forget to communicate the disclaimer or notice to the customer.

SUMMARY

Embodiments of the disclosure are directed to an electronic computing device comprising: a processing unit; and system memory, the system memory including instructions which, when executed by the processing unit, cause the electronic computing device to: monitor audio from a conversation; identify one or more keywords from the audio; identify a context of the conversation from the audio; display one or more alerts on a display screen of the electronic computing device, each of the one or more alerts corresponding to the context of the conversation, each of the one or more alerts corresponding to a notification to be communicated to an individual; obtain one of the notifications; and display the notification on the display screen of the electronic computing device.

In another aspect, a server computer includes instructions that, when executed by a processing unit of an electronic computing device, cause the processing unit to: receive a first message from an electronic computing device, the first message including one or more keywords from a conversation and an identification of a context of the conversation; identify one or more notices or disclaimers corresponding to the one or more keywords and the context; send a checklist of notice or disclaimer items to the electronic computing device, the checklist being created based on the one or more keywords and the context; receive a selection of a notice or disclaimer item from the electronic computing device; and send to the electronic computing device a notice or disclaimer corresponding to the notice or disclaimer item.

In yet another aspect, a method includes: an electronic computing device comprising instructions that, when executed by a processing unit of an electronic computing device, cause the electronic computing device to: monitor audio from a conversation; identify one or more keywords from the audio; identify a context of the conversation from the audio; display on an augmented reality headset of the electronic computing device a checklist of notice or disclaimer items corresponding to the context and keywords, each notice or disclaimer item comprising one or more words or phrases identifying a notice or disclaimer to be communicated to a customer; receive a selection of a notice or disclaimer item; receive text of a notice or disclaimer corresponding to the selected notice or disclaimer item; display the notice or disclaimer on an augmented reality headset display; record audio of one or more parts of the conversation, the recorded audio indicating that the notice or disclaimer has been communicated to the customer; check a checkbox on the checklist adjacent to a notice or disclaimer item corresponding to the notice or disclaimer that has been communicated to the customer or change a display color of a notice or disclaimer item corresponding to the notice or disclaimer that has been communicated to the customer; and send a recording to the server computer of the communications of the notices and disclaimers to the customer.

The details of one or more techniques are set forth in the accompanying drawings and the description below. Other features, objects, and advantages of these techniques will be apparent from the description, drawings, and claims.

DESCRIPTION OF THE DRAWINGS

FIG. 4 shows an example checklist display for applying for a checking account.

FIG. 5 shows an example checklist display for applying for a payment card.

FIG. 6 shows an example checklist display for applying for a mortgage.

DETAILED DESCRIPTION

Figure 1:
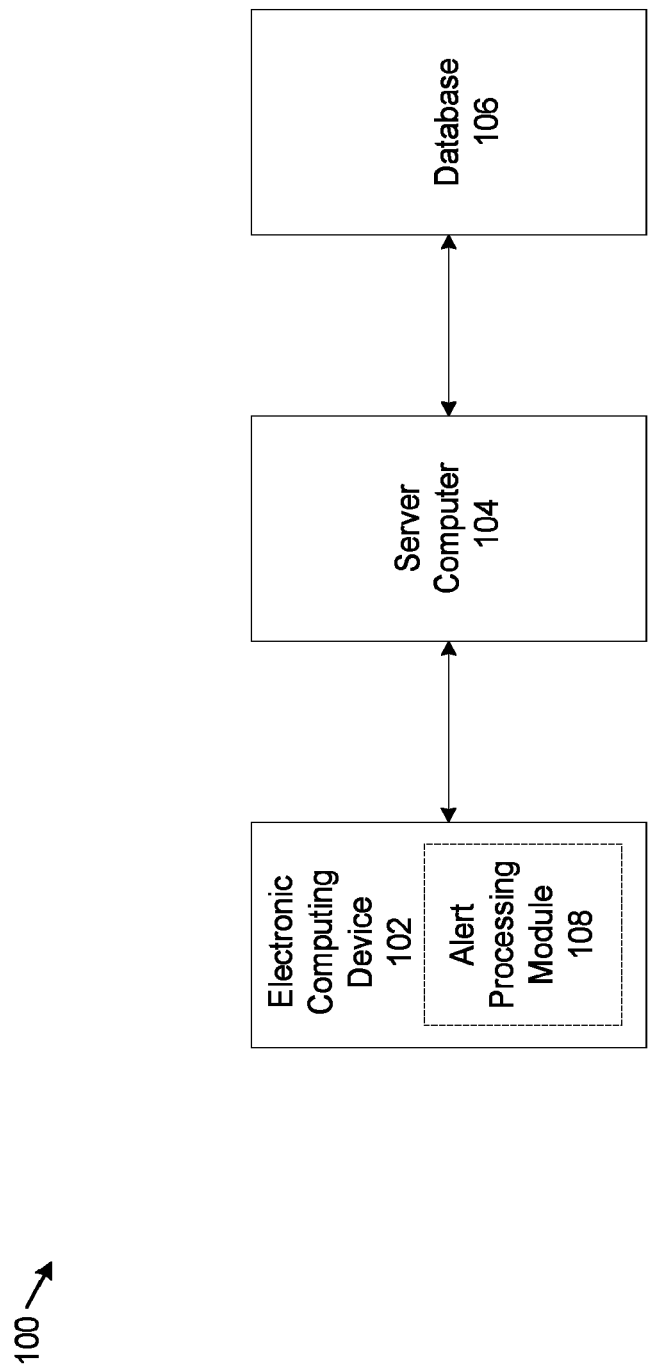
FIG. 1 shows an example system that supports automatic notification generation.

The present disclosure is directed to systems and methods for automatically providing alerts to employees of a business or other organization. The alerts can be used to communicate certain notifications to a customer of the business or an individual who is interacting with the other organization. In one example implementation, the alerts can be displayed on a headset of an augmented reality (AR) electronic device. In this implementation, the alerts can be in the form of a checklist of notification items that provides keywords or phrases corresponding to a notification that is to be communicated to the customer. As discussed later herein, other types of alerts and other types of devices for displaying the alerts are possible.

As used in this disclosure, the notification can be a notice or a disclaimer. As used in this disclosure, a notice is a statement regarding a product, a service, a document, a drug, a policy, a matter of law or other such item that can be communicated to an individual that interacts with a business or other type of organization. The notice can explain or clarify one or more aspects on the product, service, document, drug, policy, matter of law or other such item. As used in this disclosure, a disclaimer is a statement that denies responsibility of a business or other organization regarding a use by the individual of a product, service, document, drug, policy, matter of law or other such item.

The systems and methods are discussed herein with regard to financial organizations but can also be applied to a variety of organizations and businesses. With regard to financial organizations, there can be many interactions with customers for which notices or disclaimers may need to be communicated to the customers. Some example interactions can include customers opening a checking account, applying for a credit card, applying for a consumer loan, applying for a mortgage, opening a traditional individual retirement account (IRA) and opening a Roth IRA. Other types of such interactions are possible. As an example of an interaction in which a notice or disclaimer can be given for a non-financial interaction, in the field of law enforcement a police officer is required to explain Miranda rights to criminal suspects. The Miranda rights comprise a notice given to the criminal suspects of a right of silence when being interrogated by the police. As another example of an interaction in which a notice or disclaimer can be given for a non-financial interaction, a physician can communicate risks of surgery or side-effects of a drug to a patient. The physician can also communicate a disclaimer regarding risks of an experimental drug. Other examples are possible.

In one example implementation for a financial organization using the systems and methods, an employee of the financial organization can wear an AR headset, part of an AR device, when interacting with a customer who is applying for a mortgage. In this example and throughout, the employee of the financial organization is referred to as a banker. As a matter of law or bank policy the banker may be required to communicate certain notices or disclaimers to the customer during the mortgage application process. Using the systems and methods, a conversation between the banker and the customer can be monitored using vocal recognition software on the AR device. As the banker and the customer communicate, the vocal recognition software can identify certain keywords that indicate that the customer may be interested in applying for a mortgage. Context analysis software on the AR device can identify a context of the conversation, specifically that the customer is applying for a mortgage. In addition, if the customer is identified by name or an account number is mentioned, a determination can be made as to whether the customer already has a mortgage with the bank and wants to refinance the mortgage or whether the customer is applying for a new mortgage.

In the example implementation, the keywords and context are sent to a server computer. After a determination is made at the server computer that the customer is applying for a mortgage, the server computer can send a checklist of required notices and disclaimers to be communicated to the customer. When the augmented reality device receives the checklist, the checklist can be displayed on the AR headset. In other implementations, software on the AR device can create the checklist of required notices and disclaimers without the use of the server computer.

The checklist can comprise a list of words or phrases that provide hints to the banker as to a notice or disclaimer to be communicated to the customer. For the new mortgage application, examples of the words or phrases in the checklist can include such items as initial interest rate, changes to interest rates, application costs, closing costs, late payments, and foreclosure alert. More, fewer or different checklist items can be included. For other contexts, different checklist items can be used. In addition, sub-contexts can be used. For example, for a context of a traditional IRA, different sets of checklist items can be displayed for sub-contexts such as applying for the IRA, rolling over the IRA and closing the IRA.

When the banker discusses a checklist item with the customer, the vocal recognition software can detect that the checklist item is being discussed. In some implementations, when the banker is not familiar with a notice or disclaimer associated with a checklist item or if the banker forgets the contents of the notice or disclaimer, the banker can ask for the notice or disclaimer to be displayed. For example, the banker can verbally say "Access" and a checklist item. The vocal recognition software can detect that the checklist item and command to "access" have been spoken and send the checklist item to the server computer. The server computer can then send the notice or disclaimer corresponding to the checklist item to the AR device. The AR device can then display the notice or disclaimer on the AR headset so that the banker can read aloud the notice or disclaimer to the customer.

In the example implementation, when the checklist is displayed to the banker on the AR headset, a checkbox can appear to the left of each checklist item. The vocal recognition software can detect when a notice or disclaimer is communicated to the customer and can check the checkbox when a determination is made that the notice or disclaimer is communicated to the customer. In other implementations, instead of a checkbox, the checklist item can change color when the notice or disclaimer is communicated to the customer. For example, the checklist item can change to a green color when the notice or disclaimer is communicated to the customer. In some implementations, checklists can be turned on or off upon a command.

The server computer can track the notices and disclaimers that are sent to the AR device and that are communicated to the customer. When the session between the banker and the customer is ended, the server computer can generate a report that summarizes the interaction between the banker and the customer and that indicates a status of the notices and disclaimers for the interaction. The report can indicate which notices and disclaimers have been communicated to the customer and also display omissions, for example which, if any, notices and disclaimers were supposed to be communicated to the customers but were not communicated to the customers.

The server computer can also annotate customer files to provide a history of communications between the customer and the banker and to verify that a required notice or disclaimer was communicated to the customer. In some implementations, the server computer can receive a recording of all or part of the interaction between the banker and the customer and save the recording on the server computer or a database accessible from the server computer. The recording can be created on the AR device and can include audio and/or video. Parts or snippets of the recording can provide verification that that the required notice or disclaimer was in fact communicated to the customer.

In addition to the checklist items discussed above herein, the alert displayed on the AR device can also take the form of one or more reminders. Each reminder can be a word or a phrase that can remind the banker to communicate a notice or disclaimer to the customer. For example, instead of displaying a checklist of items to be discussed, serial reminders can be displayed on the AR device. For example, one reminder can be APR. After the notices or disclaimers for APR have been communicated, another reminder can be displayed, for example fees, etc.

The AR device can be a mobile electronic device, such as a smart telephone or tablet computer. The AR device can also be an AR headset that may be worn by a user. Other AR devices are possible.

The AR headset can include a wearable computer, a camera and an optical display. The wearable computer can include a wireless telecommunication capability, permitting a wireless connection between the wearable computer and one or more server computers. The wearable computer can also include voice recognition capability, permitting the user to direct the wearable computer via voice commands. In addition, in some implementations, the wearable computer can also include biometric capability such as facial recognition, retinal scan capability, finger print scan capability, and/or voice print analysis capability. The optical display reflects projected images and also permits the user to see through the display.

The wearable computer can also include global positioning system (GPS) software that can identify a geographical location for the AR device. The geographical location can indicate the location of a state in the United States in which the financial institution is located. In an example implementation, the notices or disclaimers that are displayed on the AR device can be consistent with the laws of the state in the United States in which the AR device is located.

The systems and methods disclosed herein can improve efficiencies of organizations who interface with individuals. By automatically detecting keywords and a context of a conversation between the individual and an employee of an organization required, notices or disclaimers can be quickly and efficiently made available to the employee so that the notices or disclaimers can be communicated to the individual. In addition, displaying alerts on the AR device makes it less likely that the employee will forget to communicate the notices or disclaimers to the individual. Further, displaying the actual notice or disclaimer on the AR device makes it more likely that the employee will accurately communicate the notices or disclaimers to the customer. In addition, automatically recording all or part of the conversation between the employee and the individual provides verification that the notices are disclaimers were actually communicated to the individual. All these actions improve efficiencies for the organization because they reduce interaction time between the individual and employee and also make it less likely that the notices or disclaimers will need to be communicated to the individual more than once.

FIG. 1 shows an example system 100 that can support automatic disclaimer generation. The system 100 can include an electronic computing device 102, a server computer 104 and a database 106. The electronic computing device 102 includes an alert processing module 108.

The example electronic computing device 102 can be an AR device, such as an AR headset. One or more checklists, reminders or other alerts can be displayed on the AR headset. The AR device can also be a smartphone with an AR software application. In some implementations, the checklist or reminders can be displayed on the display screen of the smartphone. In other implementations, the smartphone can be used in conjunction with a smart watch and the checklist or reminders can be displayed on the display screen of the smart watch. In still other implementations, the AR device can be a desk that has a smart glass display; the checklist or reminders can be displayed on the smart glass display. Other electronic computing devices 102 can be used, including a tablet computer.

The example alert processing module 108 can detect keywords and a context of a conversation. The alert processing module 108 can then display on the display screen of the AR device alerts corresponding to the keywords and context and actual text of notices and disclaimers corresponding to the alerts. The alert processing module 108 is described in more detail later herein.

The example server computer 104 is a server computer at an organization, for example at a financial institution, a law enforcement agency, a business organization in a field other than finance, etc. The server computer can interface with the electronic computing device 102. The server computer 104 can obtain information for checklist items and reminders and send this information to the electronic computing device 102. The server computer can also obtain actual notices and disclaimers corresponding to checklist items and reminders and send the notices and disclaimers to the electronic computing device 102. As discussed in more detail later herein, the server computer 104 can also perform tracking and reporting of notices and disclaimers.

The database 106 is an electronic database that is accessible from server computer 104. The database 106 can store notices and disclaimers that can be accessed by server computer 104 and sent to electronic computing device 102. In some implementations, some or all of the notices and disclaimers can also be stored on server computer 104.

Figure 2:
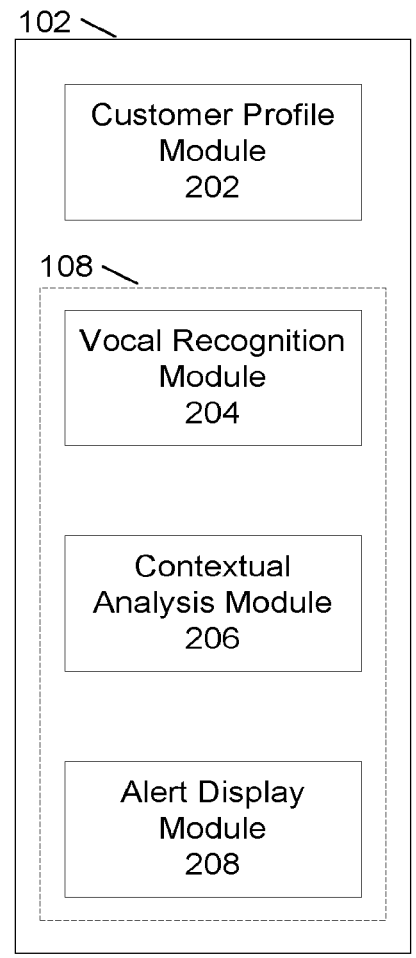
FIG. 2 shows example modules of the checklist display electronic device of FIG. 1.

FIG. 2 shows example modules of the electronic computing device 102. The example modules include a customer profile module 202 and the alert processing module 108. The example alert processing module 108 includes a vocal recognition module 204, a contextual analysis module 206 and an alert display module 208. More, fewer or different modules are possible.

The example customer profile module 202 can include a profile of a customer in which a financial institution employee is interacting. The profile can include information such as the name, address, telephone number, date of birth, occupation, employer, current salary, etc., for the customer. The profile can also include information regarding accounts the customer may have at the financial institution, such as checking accounts, savings accounts, credit cards, loans and mortgages. The customer profile module 202 can obtain the profile from the server computer 104.

In an example implementation, the AR device can include a banking software application. When the banker starts a conversation with the customer, the banker can initiate the banking software application and obtain the customer profile from server computer 104. The banker can use the customer's name or an account number for the customer to obtain the customer profile from server computer 104.

The example vocal recognition module 204 can recognize words from spoken audio and identify keywords and phrases from live and recorded speech. The keywords can be predetermined based on types of interactions expected between the banker and the customer. Example keywords and phrases can include checking, savings, account, credit card, debit card, loan, mortgage, retirement, IDA, Roth, etc. More, fewer or different words and phrases can be identified.

The example contextual analysis module 206 attempts to identify a context for the interaction between the banker and the customer by making use of the identified keywords and phrases and the customer profile. Example contexts can include an application for a checking account, an application for a loan, an application for a payment card, such as a credit card or a debit card, an application to open a retirement account, such as a traditional retirement account or a Roth retirement account. Other contexts are possible.

The example alert display module 208 controls a display of alerts on a display screen of the AR device. The alerts can include a checklist of disclaimer items, one or more reminders regarding disclaimers, a message that a disclaimer item has been skipped or that the interaction has been completed but one or more disclaimers have not been communicated to the customer, etc. Other alerts are possible. The alert display module 208 also controls a display of actual text of notices and disclaimers on the display screen of the AR device.

Figure 3:
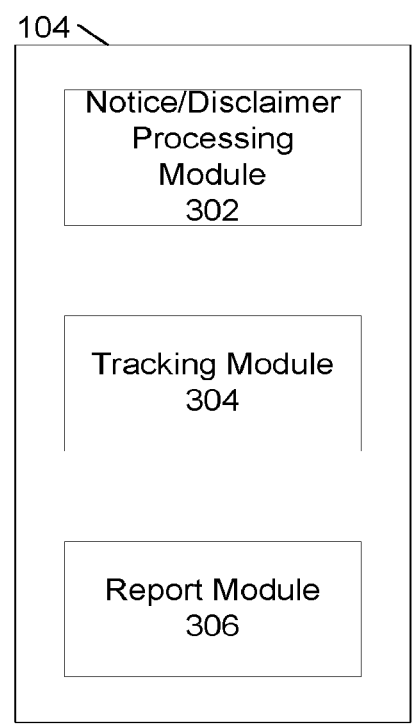
FIG. 3 shows example modules of the server computer of FIG. 1.

FIG. 3 shows example modules of the server computer 104. The example modules include a notice/disclaimer processing module 302, a tracking module 304 and a report module 306. More, fewer or other modules can be included.

The example notice/disclaimer processing module 302, receives one or more keywords and a context from the electronic computing device 102. The notice/disclaimer processing module 302 then determines from the keywords and context which notices and disclaimers are needed to be communicated to the customer based on the context. The notice/disclaimer processing module 302 can create one or more alerts regarding the notices and disclaimers and send the alerts to the electronic computing device 102. The notice/disclaimer processing module 302 can format the alerts into a list of notice/disclaimer items or the notice/disclaimer processing module 302 can format the alerts into a series of reminders. When the electronic computing device 102 receives the alerts, the alerts can be displayed on the electronic computing device 102.

The notice/disclaimer processing module 302 also obtains text for needed notices and disclaimers and sends the text to the electronic computing device 102. The text can be stored on server computer 104, on database 106 or on a server computer or database accessible from server computer 104. In an example implementation, the notice/disclaimer processing module 302 sends the text to the electronic computing device 102 when prompted to do so by the electronic computing device 102. The prompt can be in the form of a message received at server computer 104 requesting that the text of the notice or disclaimer be sent to the electronic computing device 102.

The example tracking module 304 receives notifications from the electronic computing device 102 when a notice or disclaimer is communicated to a customer. The tracking module 304 keeps track of the notifications, determines whether the notice or disclaimer was sent in a proper sequence and determines a next sequential notice or disclaimer to be sent to the electronic computing device 102. The tracking module 304 can also receive notifications from the notice/disclaimer processing module 302 when a request is received at the notice/disclaimer processing module 302 for a specific notice or disclaimer.

The example report module 306 receives status information from the tracking module 304 and generates a report for the financial institution when the interaction between the banker and the customer has been completed. The report can summarize the interaction including the context of the interaction, provide a list of notices and disclaimers that were communicated to the customer during the interaction and provide a list on any notices and disclaimers that were supposed to be communicated to the customer but were not. The report can also be sent to the banker so that the banker can take any remedial action, if required, regarding a notice or disclaimer that was omitted from the customer interaction.

FIG. 4 shows an example checklist display 400 for applying for a checking account at the bank. The checklist display 400 can be displayed when the vocal recognition module 204 and the contextual analysis module 206 determine that the customer is opening a checking account at the bank. The checklist display 400 can also be displayed when a banker manually indicates that the customer is applying for a new checking account. For example, the banker can activate a menu item for a checking account on a banking software application displayed on a smartphone. The banker can also say a word or phrase such as new checking account. Other ways to initiate the checklist display 400 are possible.

The checklist display 400 shows a list of example disclaimer items. As shown in FIG. 4, the disclaimer items include minimum balance, fees, surcharges, waivers and bonuses. More, fewer or other disclaimer items are possible.

For the example checklist display 400, the minimum balance disclaimer item is directed to a minimum balance that the customer is required to maintain in the checking account. The disclaimer can include a statement indicating a fee that the customer will pay if the checking account balance drops below the minimum balance. Similarly, fees are directed to fees such as an initial fee for the checking account, a monthly maintenance fee, late payment fees, overdraft fees and other fees. Surcharges can be directed to additional fees that may be applied to the customer, for example a fee that can be applied when the minimum balance falls below a certain predetermined limit.

Waivers can be directed to instances where fees can be waived. In an example implementation, a monthly service fee of $10 for a checking account can be waived if one of the following example conditions are met for monthly statement cycle: maintaining a $1,500 minimum daily balance, having $500 or more in total qualifying direct deposits to the checking account or having ten or more debit card purchases and/or payments from the checking account. More, fewer or different waiver conditions can be used.

Bonuses can be directed to rewards points can that be earned through usage of the checking account. As an example, a relationship bonus of 10%, 25% or 50% on rewards points can be earned for net purchases made using the checking account and other usage conditions. For example, a rewards point bonus of 10% can be earned or having a checking account at the financial institution. Additional rewards points bonuses of 25% or 50% can be earned depending on a statement balance for the checking account or depending on a number of additional accounts, such as savings accounts or credit card accounts owned by the customer.

For the example checklist display 400, a checkbox is displayed to the left of each disclaimer item. In an example implementation, the banker can view the checklist display 400 on the banker's headset display. The banker can view the first disclaimer item, minimum balance, and discuss minimum balance requirements for the checking account with the customer.

If the banker is not sure what exactly needs to be disclosed to the customer, the banker can say the words "Access minimum balance" or otherwise indicate that the banker needs help with the minimum balance disclaimer item. For example, if the banker needs to be discreet about needing help, the banker can use a predetermined code term such as "first disclaimer" when talking to the customer. The AR device can detect the term "first disclaimer" and send a message to server computer 104. As a result, server computer 104 can send text for a notice or disclaimer corresponding to minimum balance to the AR device. The notice or disclaimer can then be displayed on the AR headset for the banker to view and read to the customer.

The vocal recognition software on the AR device can detect when the banker has discussed the required minimum balance for the checking account with the customer. In the example implementation, when the vocal recognition software detects that the required minimum balance is discussed, the AR device can check the checkbox to the left of "minimum balance" on the checklist display 400. In some implementations, a message indicating that the minimum balance requirement has been discussed is sent to server computer 104 before the checkbox is checked. In this implementation, the AR device does not check the checkbox until after a confirmation message has been sent from server computer 104.

In other implementations, instead of displaying a checkbox to the left of the disclaimer items, the disclaimer items can all be displayed in a specific color, for example in red. In this implementation, after a specific disclaimer item has been discussed with the customer, the disclaimer item that has been discussed can change color—for example from red to green. As discussed above, the AR device can change the color when the AR device detects that the disclaimer item has been discussed with the customer or the AR device can wait for a confirmation message from the server computer before changing the color. After one notice or disclaimer item has been discussed, in some implementations, the next notice or disclaimer item to be discussed can be highlighted, for example by changing color, by being displayed in a bold color, by flashing or by some other similar means.

As stated earlier herein, the AR device can record all or part of a discussion between the banker and the customer regarding a disclaimer item. The recording can also include a recording of the customer's voice or a snippet of video of the customer during the discussion, as evidence that the customer has heard the disclaimer. The recording can be sent to server computer 104 for storage on server computer 104, on database 106 or on a server computer or database accessible from server computer 104. In some implementations, the AR device or server computer 104 can extract snippets of the recording that are pertinent to the communication of the disclaimer item to the customer. This can be done as a way to reduce memory requirements for storing the snippets of the recording.

The server computer can customize a display of disclaimer items to be discussed based on a profile and history of the customer. For example, if the customer has already opened a checking account with the bank, the customer may have already been informed about one or more of the disclaimer items. In this case, the one or more disclaimer items that have been previously discussed with the customers can be left off the checklist display 400 so that the banker does not discuss a disclaimer item that has been previously communicated to the customer.

FIG. 5 shows an example checklist display 500 for applying for a payment card at the bank. The checklist display 500 can be displayed when the vocal recognition module 204 and the contextual analysis module 206 determine that the customer is applying for a payment card, for example a credit card or a debit card. As for the example checklist display 400, the checklist display 500 includes an example list of disclaimer items, with a checkbox being displayed to the left of each disclaimer item.

The example disclaimer items include initial APR, changes to APR, fees, loss of card and zero liability protection. More, fewer or different disclaimer items can be displayed. Initial APR is directed to informing the customer of an initial APR for the payment card. In some cases, the initial APR comprises an introductory interest rate that is scheduled to increase in a predetermined period of time, for example in 6 months. Changes to APR is directed to information the customer needs to know regarding changes to the initial interest rate. For example, the customer needs to be informed that the initial interest rate will increase, for example double, if the predetermined period of time. Fees are directed to any initial fees, monthly fees, late fees, fees for loss of card, etc., that are associated with the payment card and that the customer may need to pay. Loss of card is directed to procedures that the customer needs to know about when the payment card is lost or stolen. This may include any fees the customer may need to pay as a result of authorized use of the payment card and any replacement costs for the payment card. Zero liability protection is directed to a bank policy regarding liability of the customer regarding unauthorized use of the payment card. Customers generally have a maximum liability of $50 for authorized use of a payment card when certain conditions are met, such as reporting the loss of the payment card within a certain period of time.

When disclaimers or notices for the disclaimer items above are communicated to the customer, for the example in FIG. 500 a checkbox is checked next to disclaimer item. In other implementations, as discussed above herein, a color of the displayed disclaimer item may change. In addition, server computer 104 can track what disclaimer items have been communicated to the customer and can generate a report to the customer and to the banker regarding a status of disclaimer items communicated to the customer.

FIG. 6 shows an example checklist display 600 for applying for a mortgage at the bank. The checklist display 600 can be displayed when the vocal recognition module 204 and the contextual analysis module 206 determine that the customer is applying for a mortgage. As for the example checklist display 400, the checklist display 600 includes an example list of disclaimer items, with a checkbox being displayed to the left of each disclaimer item.

The example disclaimer items include initial APR, changes to APR, application costs, closing costs, late payments, private mortgage insurance and foreclosure alert. More, fewer or different disclaimer items can be displayed. Initial APR is directed to an initial interest rate for the mortgage. If the mortgage is a variable rate mortgage, a disclaimer needs to be communicated to the customer that this initial interest rate will change at some point during the life of the mortgage. Changes to APR are directed to disclaimers relating to changes to APR over the life of the mortgage. For example, the disclaimers can disclose when the APR can change, how much the APR can change, how many times the APR can change during the course of the mortgage, etc. Disclaimers relating to application costs, closing costs and late payments are directed to fees and bank policies regarding these three items. Disclaimers directed to private mortgage insurance can indicate policies regarding a need to obtain private mortgage insurance. Generally, private mortgage insurance is required when a down payment on the mortgage is less than a predetermined amount, for example 20 percent. Disclaimers relating to a foreclosure alert are directed to the bank's policies regarding foreclosures, for example any responsibility the bank may have in providing notices to the customer when the mortgage is in danger of being foreclosed.

Disclaimers and notices can be included for other financial or other situations such as applying for a traditional IRA, applying for a Roth IRA, interrogating a criminal suspect, explaining hospital policy to a patient being admitted to a hospital, purchasing a used car, etc. The same methodology regarding the use of checkboxes or colors for the disclaimer items, the tracking of disclaimer items and the generation of reports can apply to these financial and other situations.

Figure 7:
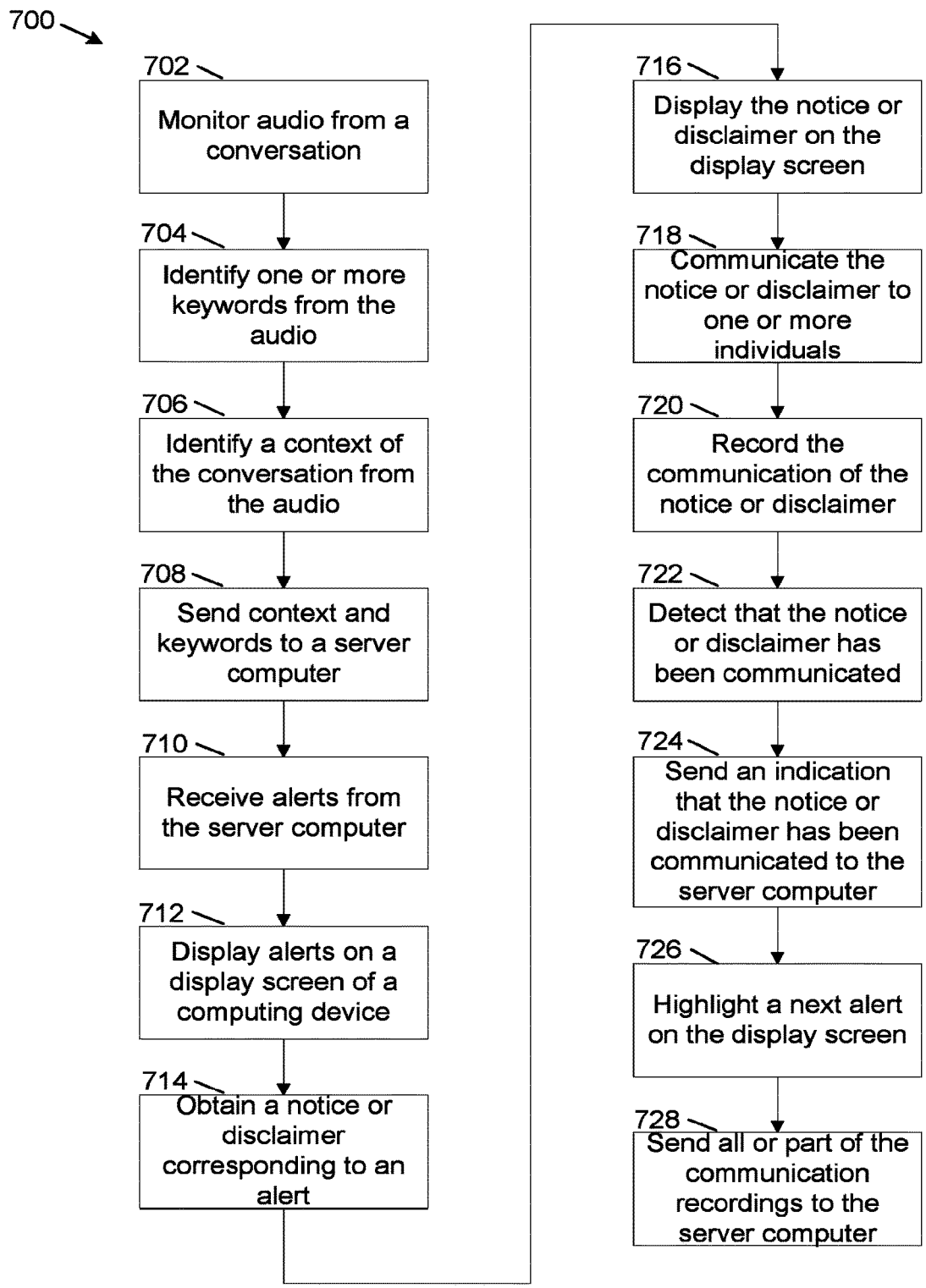
FIG. 7 shows a flowchart of an example method for providing alerts for notices and disclaimers for customers of a financial institution.

FIG. 7 shows a flowchart of an example method 700 for automatically providing alerts for notices and disclaimers for customers of a financial institution. For method 700, the alerts are provided to an employee of the financial institution, referred to as a banker, on a headset display of an AR device worn by the banker. Some or all of the operations of method 700 can also apply to non-financial applications, as discussed earlier herein. Also, as discussed earlier herein, the alerts can be displayed on devices such as tablet computers, smartphones, smart watches, smart tables and other similar devices.

At operation 702, a conversation between the banker and the customer is monitored by the AR device. In an example implementation, the customer can meet with the banker at a local bank branch office to discuss one or more banking products of interest to the customer. For example, the customer can be interested in opening a checking account, obtaining a credit or debit card, applying for a car loan or other personal loan, applying for a mortgage for a new house, refinancing an existing mortgage, opening a traditional IRA, opening a Roth IRA, converting a traditional IRA to a Roth IRA, etc.

When the customer and banker converse regarding the customer's area of interest, vocal recognition software on the AR device can monitor the audio of the conversation. In some implementations, the vocal recognition software on the AR device is automatically activated when the banker activates a financial software application on the AR device. In other implementations the vocal recognition software on the AR device is manually activated by the banker.

At operation 704, the vocal recognition software can recognize one or more keywords and phrases from the audio of the conversation. The keywords and phrases can be words and phrases that are commonly used in banking scenarios. Some example keywords can include mortgage, loan, IRA, checking, savings, refinancing and open. Some example phrases can include checking account, savings account, car loan, mortgage for a new house, open an IRA and transfer an IRA. More, fewer or different keywords and phrases can be used. The keywords and phrases can be programmed into the vocal recognition software.

At operation 706, a context can be identified from the keywords, phrases and from a customer profile, if available. In some implementations, the customer profile can be obtained from a server computer and made available for viewing on the AR device. For example, at the start of the conversation, the banker can ask the customer if he/she has an account at the bank and if the customer has an account at the bank, the customer profile can be obtained. In some implementations, the customer profile can be downloaded to the AR device in advance of the customer visit.

The context can be identified by analyzing the keywords and phrases detected during the conversation in conjunction with the customer profile. For example, if a keyword of mortgage is detected and the customer profile indicates that the customer already has a mortgage at the bank, the context can be identified as refinancing a mortgage. For example method 700, the AR device can include a financial software application that automatically identifies the context from the keywords, phrases and customer profile. In other implementations, the keywords and phrases can be sent to a server computer for identifying the context.

At operation 708, the context and keywords are sent to a server computer, for example server computer 104. The server computer can use the context and keywords to identify notices and disclaimers that need to be communicated to the customer based on the context. In some cases, the notices and disclaimers need to be communicated as a matter of law. In other cases, the notices and disclaimers are communicated as a matter of company policy. The server computer can identify one or more alerts that can provide hints to the banker as to a notice or disclaimer that needs to be communicated to the customer. In some implementations, the alerts can take the form of a checklist of notice and disclaimer items, as discussed earlier herein. In other implementations, the alerts can take the form of one or more reminders to the banker, as also discussed earlier herein.

At operation 710, the alerts are received from the server computer at the AR device. The alerts can be in the form of a message sent from the server computer to the AR device.

At operation 712, the alerts are displayed on the display screen of the AR device. For the example method 700, the alerts are displayed as a checklist of notice or disclaimer items. Each notice or disclaimer item comprises a word or a phrase that provides a hint to the banker to communicate or otherwise disclose a notice or disclaimer corresponding to the notice or disclaimer item to the user. For example, for a context of applying for a credit card, some example notice or disclaimer items can include initial APR, changes to APR, fees, loss of card and zero liability protection. More, fewer or other notice and disclaimer items are possible for the context of applying for a credit card.

For the example method 700, the checklist of notice or disclaimer items is projected on the headset display of the AR device so the banker can view the checklist at the same time the banker is looking at the customer. For method 700, each notice or disclaimer item is displayed with a checkbox to the left of the notice of disclaimer item.

At operation 714, a notice or disclaimer corresponding to a notice or disclaimer item is obtained. The banker can select the notice or disclaimer item by manually touching the notice or disclaimer item on the AR headset display. Alternatively, the banker can say the notice or disclaimer item and the vocal recognition software can detect that the notice or disclaimer item is selected. For instances where discretion is needed, the banker can say a word or phrase the vocal recognition software can detect as a selection. For example, in some implementations, the banker can say the word "next" or "item" or another command and the vocal recognition software can recognize that the next notice or disclaimer item on the checklist is to be selected.

For the example method 700, when a notice or disclaimer item is selected, an indication of the selection is sent to server computer 104. Server computer 104 can then obtain text of the notice or disclaimer corresponding to the selected notice or disclaimer item and send the text of the notice or disclaimer to the AR device. Server computer 104 can obtain the notice or disclaimer from server computer 104, from database 106 or from a server computer or database that is accessible from server computer 104. In some implementations, one or more of the notices or disclaimers may be stored on the AR device and obtained from the AR device.

At operation 716, the notice or disclaimer corresponding to the notice or disclaimer item selected is displayed on the headset display of the AR device.

At operation 718, the banker can communicate notice or disclaimer to the customer. The banker can communicate the notice or disclaimer by reading the notice or disclaimer to the customer. In lieu of reading the actual text of the notice or disclaimer, the banker can also read specific parts of the notice or disclaimer or discuss the notice or disclaimer with the customer. The banker can also ask the customer to verify that they understand the notice or disclaimer.

At operation 720, audio of the communication of the notice of disclaimer to the customer is recorded. The recorded audio can verify that the banker communicated the notice or disclaimer to the customer and also that the customer heard and understood the notice or disclaimer. It is also possible that the camera on the AR device can be used to take a snippet of video from the conversation. In some implementations, recording can start upon a manual command from the banker, for example at a start of the conversation between the banker and the customer. In other implementations, the recording can start and stop automatically at different times during the conversation. For example the recording can automatically start when the banker selects the first notice or disclaimer item on the checklist and the recording can automatically stop when the last notice or disclaimer is communicated to the customer. Other scenarios for manually and/or automatically stopping and starting the recording of the conversation between the banker and the customer are possible.

At operation 722, the vocal recognition software on the AR device can detect that the notice or disclaimer has been communicated to the customer. In an example implementation, the vocal recognition software can detect that the notice or disclaimer has been communicated to the customer when the banker pauses after reading the notice or disclaimer or when the banker asks the customer whether the customer understands the notice or disclaimer. The vocal recognition software can also detect other indications from the banker or the customer that the notice or disclaimer has been communicated. For example, the banker can say a word like "next" or "done" after the notice or disclaimer has been communicated. Other ways in which the AR device can detect that the notice or disclaimer has been communicated to the customer are possible.

At operation 724, an indication that the notice of disclaimer has been communicated to the customer is sent to server computer 104. The indication can be sent in a message from the AR device to server computer 104.

At operation 726, a next alert is highlighted on the headset display of the AR device. For method 700, the next alert is the next notice or disclaimer in the checklist that is to be communicated to the customer. For example method 700, after a detection is made in operation 722 that the notice or disclaimer has been communicated to the customer, the checkbox to the left of the notice or disclaimer item corresponding to notice or disclaimer is checked. In addition, the next notice or disclaimer item can change color, change to a different font, such as a bold font, flash or otherwise be highlighted to indicate that the notice or disclaimer item is to be used next. Other ways to highlight the next alert on the display screen are possible.

At operation 728, all of part of the recordings of the conversation between the banker and the customer are sent to server computer 104. The recordings are sent to server computer 104 as verification of what notices and disclaimers were communicated to the customer. In some implementations, all of the recordings are sent to server computer 104. In other implementations, the AR device can create snippets of the recordings and send the snippets of the recordings to server computer 104. For example, in some implementations software on the AR device can create the snippets of various aspects of the conversation. Example snippets can include a beginning of the conversation between the banker and the customer and snippets of a communication of each or the notice and disclaimer items on the checklist. Other snippets are possible.

Figure 8:
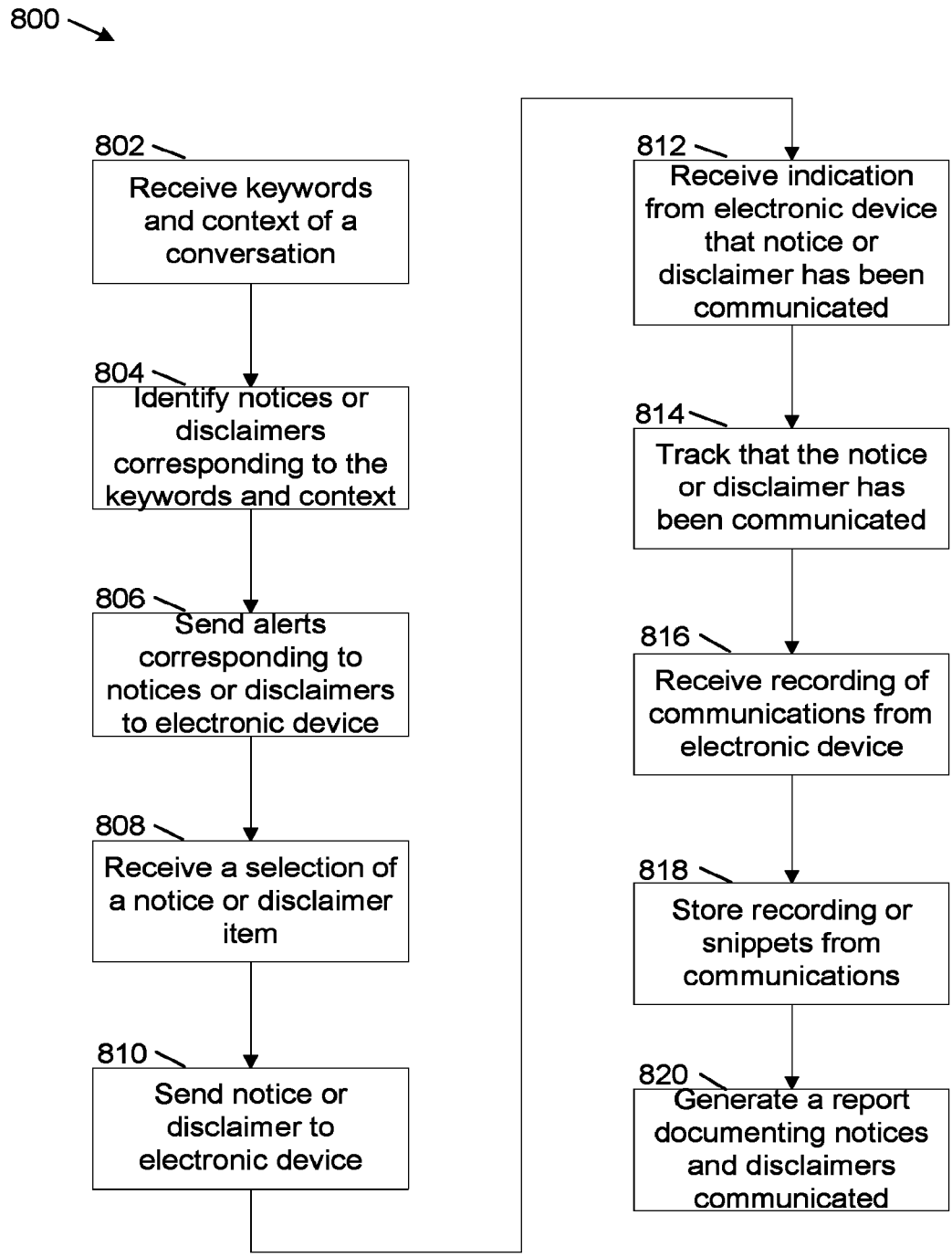
FIG. 8 shows another flowchart of an example method for providing alerts for notices and disclaimers for customers of a financial institution.

FIG. 8 shows a flowchart of an example method 800 from a perspective of server computer 104 for automatically providing alerts for notices and disclaimers for customers of a financial institution. For method 800, the alerts are provided to an employee of the financial institution, referred to as a banker, on a headset display of an AR device worn by the banker. Some or all of the operations of method 800 can also apply to non-financial applications, as discussed earlier herein.

At operation 802, one or more keywords and a context of a conversation between a banker and a customer are received at server computer 104. The keywords and context are sent from an electronic computing device, for example from the headset display AR device (electronic computing device 102) used in method 700.

At operation 804, server computer 104 identifies notices or disclaimers corresponding the keywords and context received. The notices and disclaimers can be stored and obtained from server computer 104, from database 106 or from another server computer or database accessible from server computer 104.

At operation 806, alerts corresponding the notices or disclaimers are sent to electronic computing device 102. The alerts can be in the form of a checklist of notice or disclaimer items, the alerts can be in the form of serial reminders or the alerts can be in another format. When the alerts are in the form of a checklist of notice or disclaimer items, the notice or disclaimer items can be included in a message sent from server computer 104 to electronic computing device 102. Electronic computing device 102 can format the alerts as a checklist. When the alerts are in the form of serial reminders, each reminder can be sent in a separate message from server computer 104 to electronic computing device 102. When server computer 104 receives a notification from electronic computing device 102 that a notice or disclaimer corresponding to the reminder has been communicated to the customer, server computer 104 can send a next sequential reminder to electronic computing device 102.

At operation 808, a selection of a notice or disclaimer item is received at server computer 104. The notice or disclaimer item is selected by the banker per operation 714 or method 700.

At operation 810, server computer 104 obtains a notice or disclaimer corresponding the to the selected notice or disclaimer item. The notice or disclaimer can be stored and obtained from server computer 104, from database 106 or from a server computer or database accessible from server computer 104. Server computer 104 then send the notice or disclaimer to electronic computing device 102. In an example implementation, server computer 104 includes text of the notice or disclaimer in a message to electronic computing device 102.

At operation 812, server computer 104 receives an indication from electronic computing device 102 that the notice or disclaimer has been communicated to the customer. The indication can be included in a status message sent from electronic computing device 102 to server computer 104.

At operation 814, server computer 104 tracks that the notice or disclaimer has been communicated to the customer. In an example implementation, server computer 104 can track the status of each notice or disclaimer item on the checklist of notice and disclaimer items and can track indications of whether a notice or disclaimer corresponding to a notice or disclaimer item has been communicated to the customer. The tracking can be used to generate a status report of what was communicated to the customer.

At operation 816, server computer 104 receives from electronic computing device 102 one or more recordings of communications between the banker and the customer. The one or more recordings can include a recording of an entire conversation between the banker and the customer or the one or more recordings can include snippets of the conversation between the banker and the customer. When a complete a recording of the entire conversation is received, in an example implementation, software on server computer 104 can analyze the recording and create snippets of various sections of the conversation. Snippets can be beneficial because of reduced storage requirements and because of easier identification of communication of specific notices or disclaimers for verification purposes.

At operation 818, the received recordings or the snippets of the communication are stored. The recording or the snippets can be stored on server computer 104, on database 106 or on a server computer or database accessible from server computer 104.

At operation 820, server computer 104 generates a report documenting the notices and disclaimers communicated to the customer. The report can also document notices and disclaimers that were not communicated to the customer. For example, if the alerts included a notice or disclaimer item for which an indication was not received that a notice or disclaimer corresponding to the notice or disclaimer item was communicated to the customer, the notice or disclaimer item that was not communicated to the customer can be designated as an omission on the report. The report can be sent to the banker and to other personnel at the financial institution.

Figure 9:
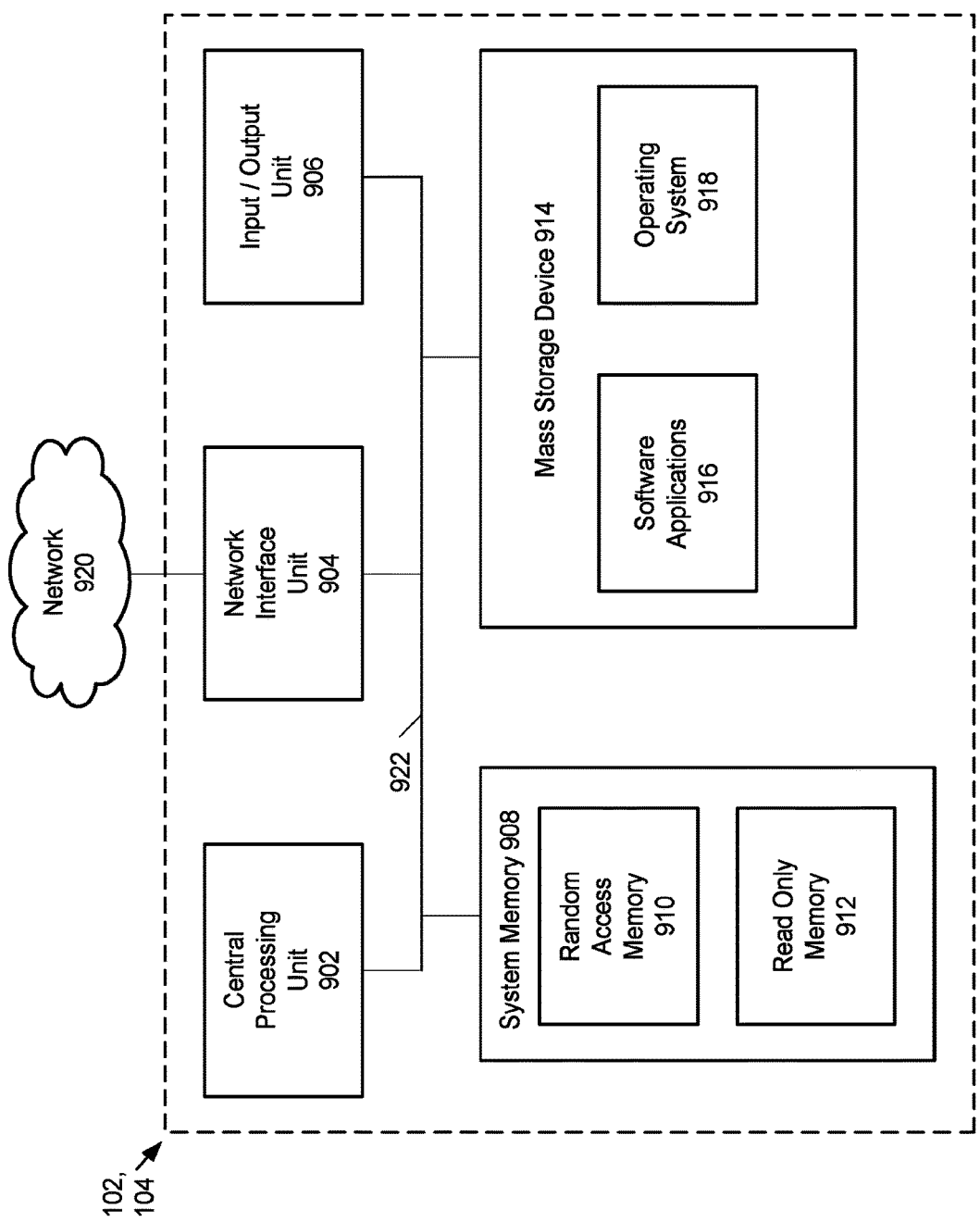
FIG. 9 shows example physical components of the checklist display electronic device and the server computer of FIG. 1.

As illustrated in the example of FIG. 9, electronic computing device 102 includes at least one central processing unit ("CPU") 902, a system memory 908, and a system bus 922 that couples the system memory 908 to the CPU 902. The system memory 908 includes a random access memory ("RAM") 910 and a read-only memory ("ROM") 912. A basic input/output system that contains the basic routines that help to transfer information between elements within the electronic computing device 102, such as during startup, is stored in the ROM 912. The electronic computing device 102 further includes a mass storage device 914. The mass storage device 914 is able to store software instructions and data. Some or all of the components of the electronic computing device 102 can also be included in server computer 104.

The mass storage device 914 is connected to the CPU 902 through a mass storage controller (not shown) connected to the system bus 922. The mass storage device 914 and its associated computer-readable data storage media provide non-volatile, non-transitory storage for the electronic computing device 102. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the electronic computing device 102.

According to various embodiments of the invention, the electronic computing device 102 may operate in a networked environment using logical connections to remote network devices through the network 920, such as a wireless network, the Internet, or another type of network. The electronic computing device 102 may connect to the network 920 through a network interface unit 904 connected to the system bus 922. It should be appreciated that the network interface unit 904 may also be utilized to connect to other types of networks and remote computing systems. The electronic computing device 102 also includes an input/output controller 906 for receiving and processing input from a number of other devices, including a touch user interface display screen, or another type of input device. Similarly, the input/output controller 906 may provide output to a touch user interface display screen or other type of output device.

As mentioned briefly above, the mass storage device 914 and the RAM 910 of the electronic computing device 102 can store software instructions and data. The software instructions include an operating system 918 suitable for controlling the operation of the electronic computing device 102. The mass storage device 914 and/or the RAM 910 also store software instructions, that when executed by the CPU 902, cause the electronic computing device 102 to provide the functionality of the electronic computing device 102 discussed in this document. For example, the mass storage device 914 and/or the RAM 910 can store software instructions that, when executed by the CPU 902, cause the electronic computing device 102 to display received data on the display screen of the electronic computing device 102.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. An electronic computing device comprising:
 a processing unit; and
 system memory, the system memory including instructions which, when executed by the processing unit, cause the electronic computing device to:
  monitor audio from a conversation;
  identify one or more keywords from the audio;
  identify a context of the conversation from the audio;
  display one or more alerts on a display screen of the electronic computing device, each of the one or more alerts corresponding to the context of the conversation, each of the one or more alerts corresponding to a notification required by law or business policy to be communicated to an individual;
  detect a selection of one of the one or more alerts;
  obtain one of the notifications based upon the selection, the notification comprising a statement from an organization regarding the selection that explains one or more aspects of the selection or that denies responsibility of the organization regarding the selection; and display the notification on the display screen of the electronic computing device.

2. The electronic computing device of claim 1, wherein the obtain one of the notifications comprises the instructions causing the electronic computing device to:
send the selection to a server computer; and
receive a notice or disclaimer from the server computer corresponding to the selection.

3. The electronic computing device of claim 1, wherein the one or more alerts comprises a checklist of notice or disclaimer items, each checklist item comprising a word or a phrase identifying the notice or disclaimer.

4. The electronic computing device of claim 3, wherein one or more of the checklist items are displayed in a specific color or wherein one or more of the one or more of the checklist items are displayed with a checkbox adjacent to the one or more of the checklist items.

5. The electronic computing device of claim 4, wherein the electronic computing device detects when a notice or disclaimer corresponding to a checklist item is read aloud.

6. The electronic computing device of claim 5, wherein the color of the checklist item changes color or the checkbox changes state when the electronic computing device detects that the notice or disclaimer corresponding to the checklist item is read aloud.

7. The electronic computing device of claim 6, wherein a notice or disclaimer item in the checklist is highlighted when the color of the checklist item changes color or when the checkbox changes state.

8. The electronic computing device of claim 1, wherein each of the one or more alerts comprises a reminder to inform a customer of one of the notifications.

9. The electronic computing device of claim 1, wherein the electronic computing device is an augmented reality device and wherein the one or more notifications are displayed on a headset of the augmented reality device.

10. The electronic computing device of claim 1, wherein the electronic computing device is a smartphone and the one or more notifications are displayed on a display screen of the smartphone.

11. The electronic computing device of claim 1, wherein the electronic computing device is a smartphone and wherein the processing unit further causes the smartphone to:
send one of the notifications to a smart watch; and
display the one of the notifications on a display screen of the smart watch.

12. The electronic computing device of claim 1, wherein the instructions further cause the electronic computing device to:
record all or part of the audio and/or video from the conversation; and
send the recording of all or part of the audio and/or video from the conversation to a server computer.

13. The electronic computing device of claim 1, wherein the instructions further cause the electronic computing device to:
use global positioning system (GPS) software on the electronic computing device to determine a geographical location of the electronic computing device; and
receive notices or disclaimers consistent with laws of a state of the United States corresponding to the geographical location of the electronic computing device.

14. A method implemented on an electronic computing device, the method comprising:
monitoring audio from a conversation;
identifying one or more keywords from the audio;
identifying a context of the conversation from the audio;
displaying one or more alerts on a display screen of the electronic computing device, each of the one or more alerts corresponding to the context of the conversation, each of the one or more alerts corresponding to a notice or disclaimer required by law or business policy to be communicated to an individual;
detecting a selection of one of the one or more alerts;
sending the selection to a server computer;
receiving a notice or disclaimer from the server computer corresponding to the selection, the notice or disclaimer comprising a statement from an organization regarding the selection that explains one or more aspects of the selection or that denies responsibility of the organization regarding the selection; and
displaying the notice or disclaimer on the display screen of the electronic computing device.

15. The method of claim 14, wherein displaying the one or more alerts on the display screen of the electronic computing device comprises displaying a checklist of notice or disclaimer items.

16. The method of claim 15, wherein each checklist item comprising a word or a phrase identifying the notice or disclaimer item.

17. The method of claim 15, wherein one or more of the checklist of notice or disclaimer items wherein the one or more alerts comprises a checklist of notice or disclaimer items, each checklist item comprising a word or a phrase identifying the notice or disclaimer.

18. The method of claim 17, wherein a notice or disclaimer item in the checklist of notice or disclaimer items is highlighted when the color of the checklist item changes color or when the checkbox changes state.

19. The method of claim 14, further comprising:
recording all or part of the audio and/or video from the conversation; and
sending the recording of all or part of the audio and/or video from the conversation to the server computer.

20. An electronic computing device comprising:
a processing unit; and
system memory, the system memory including instructions which, when executed by the processing unit, cause the electronic computing device to:
monitor audio from a conversation;
identify one or more keywords from the audio;
identify a context of the conversation from the audio;
display one or more alerts on a display screen of the electronic computing device, each of the one or more alerts corresponding to the context of the conversation, each of the one or more alerts corresponding to a notice or disclaimer required by law or business policy to be communicated to an individual;
detect a selection of one of the one or more alerts;
use global positioning system (GPS) software on the electronic computing device to determine a geographical location of the electronic computing device;
send to a server computer the geographical location of the electronic device and the selection of the one or more alerts;
receive a notice or disclaimer from the server computer corresponding to the selection, the notice or disclaimer comprising a statement from an organization regarding the selection that explains one or more aspects of the selection or that denies responsibility of the organization regarding the selection, the notice or disclaimer being consistent with the laws of a state corresponding to the geographical location of the electronic computing device; and display the notice or disclaimer on the display screen of the electronic computing device.

\* \* \* \* \*